United States Patent
Suzuki et al.

(10) Patent No.: US 6,405,772 B1
(45) Date of Patent: Jun. 18, 2002

(54) PNEUMATIC TIRE HAVING EXCELLENT STEERING STABILITY AND CHAMFERED BLOCKS

(75) Inventors: Takashi Suzuki; Kazuto Fujita; Hiroyuki Matsumoto, all of Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/482,011

(22) Filed: Jan. 13, 2000

(30) Foreign Application Priority Data

Jan. 13, 1999 (JP) .......................................... 11-006430
Dec. 2, 1999 (JP) .......................................... 11-343025

(51) Int. Cl.$^7$ ........................ B60C 11/11; B60C 107/00
(52) U.S. Cl. ................. 152/209.15; 152/902
(58) Field of Search .......................... 152/209.15, 902, 152/209.23, 209.18

(56) References Cited

U.S. PATENT DOCUMENTS

| | | | | |
|---|---|---|---|---|
| 5,733,393 A | * | 3/1998 | Hubbell et al. | 152/209.15 |
| 5,820,796 A | * | 10/1998 | Howald et al. | 425/46 |
| 5,944,082 A | * | 8/1999 | Thompson et al. | 152/209.23 |
| 5,960,845 A | * | 10/1999 | Wada | 152/209.23 |

FOREIGN PATENT DOCUMENTS

| | | | | |
|---|---|---|---|---|
| EP | 0 393 873 | | 10/1990 | |
| EP | 0 475 929 A1 | | 3/1992 | |
| EP | 0 540 339 A2 | | 5/1993 | |
| EP | 0 590 375 A1 | | 4/1994 | |
| EP | 0 661 178 A2 | | 7/1995 | |
| EP | 761479 | * | 3/1997 | 152/209.23 |
| EP | 0 865 943 A2 | | 9/1998 | |
| EP | 0 895 876 A2 | | 2/1999 | |
| GB | 1549347 | * | 8/1979 | 152/209.15 |
| JP | 2-141310 | * | 5/1990 | 152/209.15 |
| JP | 3-186405 | * | 8/1991 | 152/209.15 |
| JP | 4-100706 | * | 4/1992 | 152/209.23 |

OTHER PUBLICATIONS

Patent Abstracts of Japan, 61071208, vol. 010, No. 238, Apr. 12, 1986.
Patent Abstracts of Japan, 11227420, vol. 1999, No. 13, Aug. 24, 1999.
Patent Abstracts of Japan, 07186623, vol. 1995, No. 10, Jul. 25, 1995.
Patent Abstracts of Japan, 06055911, vol. 018, No. 292, Mar. 1, 1994.
Patent Abstracts of Japan, 10203121, vol. 1998, No. 13, Aug. 8, 1998.

* cited by examiner

*Primary Examiner*—Steven D. Maki
(74) *Attorney, Agent, or Firm*—Sughrue Mion, PLLC

(57) ABSTRACT

A pneumatic tire has a block pattern of a tread defined by a plurality of circumferential grooves extending in a circumferential direction of the tread and a plurality of lateral grooves each extending across the circumferential grooves and tread ends, wherein specified chamfered face, sipe or fine groove is formed in each block of all block rows to improve a self-aligning torque in the high-speed running of a vehicle.

3 Claims, 3 Drawing Sheets

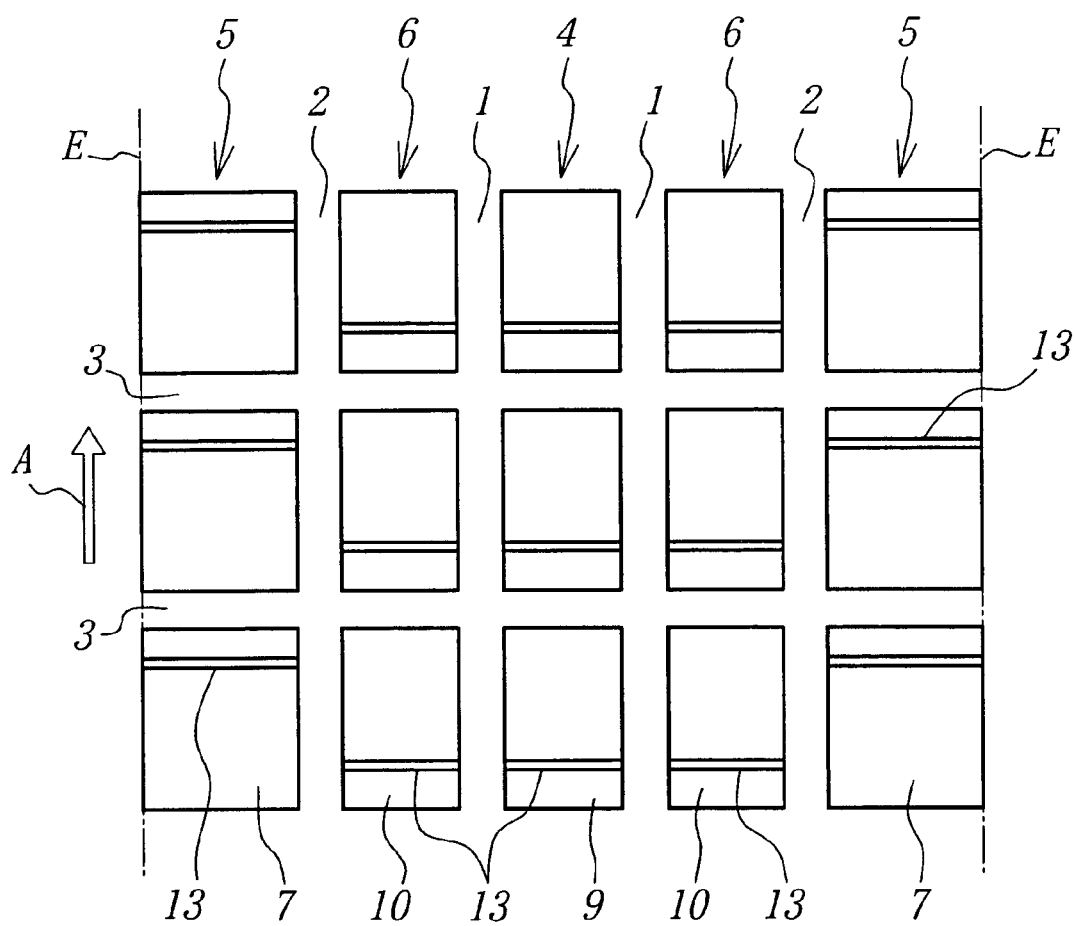

PNEUMATIC TIRE HAVING EXCELLENT STEERING STABILITY AND CHAMFERED BLOCKS

BACKGROUND OF THE INVENTION

1. Field of the Invention

This invention relates to a pneumatic tire having particularly an improved steering stability in the high-speed running of a vehicle by increasing a self-aligning torque of the tire.

2. Description of Related Art

In the running of the vehicle, the steering stability is largely affected by disturbances such as road surface state, wind and the like, which becomes serious as the vehicle speed is increased. In the conventional pneumatic tire, however, examinations on the shape of the block, formation of sipe and the like are not made for sufficiently satisfying the steering stability in the high-speed running of the vehicle.

SUMMARY OF THE INVENTION

It is, therefore, an object of the invention to provide pneumatic tires advantageously improving the steering stability in the high-speed running by directly increasing self-aligning torque of the tire through block, sipe and the like as a result of various studies with respect to the block shape and formation of sipe or fine groove therein.

According to a first aspect of the invention, there is the provision of in a pneumatic tire having a block pattern of a tread defined by a plurality of circumferential grooves extending in a circumferential direction of the tread and a plurality of lateral grooves each extending across the circumferential grooves and tread ends, the improvement wherein each block in an outermost block row in a widthwise direction is provided on its leading edge portion with a chamfered face gradually decreasing a height of the block toward a leading edge, and each block in the other block rows is provided on its trailing edge portion with a chamfered face gradually decreasing a height of the block toward a trailing edge, and a length of a chamfered face forming region is not more than $1/3$ of a circumferential length of the block.

When a slip angle is applied to this pneumatic tire, the block in the outermost block row located opposite to the applying direction of the slip angle contacts with ground at a large area under a large loading and hence a force in a forward direction produced in the leading of the block is weakened by the chamfered face formed on the leading edge portion of the block to relatively create a large force backward to a forward rotating direction of the tire as compared with the block of the other block row provided on the trailing edge portion with the chamfered face, whereby restoring moment or self-aligning torque is caused in the ground contact region of the tread. As a result, even when the tire is subjected to disturbance or the like, it is possible to smoothly and rapidly return the tire in a running direction of the vehicle. Therefore, the excellent steering stability can be realized even in the high-speed running of the vehicle.

In a preferable embodiment of the first aspect, the chamfered face is formed in a region corresponding to not more than $1/3$ of the circumferential length of the block, preferably not less than $1/10$ thereof, whereby the ground contact area of the block is sufficiently ensured.

When the length of the chamfered face forming region exceeds $1/3$ of a circumferential length of the block, the ground contact area of the block lowers and hence cornering power important for improving the steering stability is lacking, while when it is less than $1/10$, the effect by the formation of the chamfered face is actually poor.

In another preferable embodiment of the first aspect, a height of the chamfered face forming region is not more than $1/3$ of a height of the block, preferably not less than $1/10$ thereof. In this case, a big self-aligning torque can be created to effectively ensure the improvement of the steering stability during the high-speed running. When the height exceeds $1/3$, the ground contact area is decreased too much and hence the cornering power is decreased to cause a fear of degrading the steering stability, while when it is less than $1/10$, the actual effect is lacking.

In the other preferable embodiment of the first aspect, the chamfered face is a curved face convexly extending outward in a radial direction of the tire. In this case, the ground contact pressure is uniformized to control the lowering of the cornering power as compared with the case of forming a flat chamfered face or the like.

According to a second aspect of the invention, there is the provision of in a pneumatic tire having a block pattern of a tread defined by a plurality of circumferential grooves extending in a circumferential direction of the tread and a plurality of lateral grooves each extending across the circumferential grooves and tread ends, the improvement wherein a plurality of sipes each extending in a widthwise direction of the tread and being symmetry with respect to a line segment passing through a center of the block in the circumferential direction of the tread are formed in each block of the block rows so as to gradually change lengths of these sipes from an end of the block in the circumferential direction toward the other end thereof, and the sipes in each block of an outermost block row become long at a leading side of the block and short at a trailing side thereof, and the sipes in each block of the other block rows become long at a trailing side of the block and short at a leading side thereof.

In this tire, each sipe formed in each block and extending in the widthwise direction of the tread can naturally develop an excellent water film cutting performance under its edge action but also particularly decreases a block rigidity at the leading edge portion in each block of the outermost block row. As a result, when a slip angle is applied to the tire, a force in a forward direction produced in the leading of the block is decreased to relatively increase a force in a backward direction, while a block rigidity at a trailing edge portion is decreased in each block of the other block rows to relatively increase a force in a forward direction. Even in this case, the self-aligning torque can effectively be increased based on force couple in the ground contact region of the tread, whereby the excellent steering stability can be realized during the high-speed running of the vehicle.

In a preferable embodiment of the second aspect, both ends of each sipe in each block are terminated in the block, whereby the excessive lowering of the block rigidity is prevented to control the occurrence of uneven wear.

According to a third aspect of the invention, there is the provision of in a pneumatic tire having a block pattern of a tread defined by a plurality of circumferential grooves extending in a circumferential direction of the tread and a plurality of lateral grooves each extending across the circumferential grooves and tread ends, the improvement wherein each block in all block rows is provided with a single fine groove extending in a widthwise direction of the tread across the block, and the fine groove formed in each block of an outermost block row is located in a leading edge portion of the block and the fine groove formed in each block of the other block rows is located in a trailing edge portion of the block.

Even in this tire, a block rigidity in each block of the outermost block row is lower at the leading edge portion than at the trailing edge portion, while a block rigidity in each block of the other block rows is lower at the trailing edge portion than at the leading edge portion, so that the self-aligning torque can be increased to bring about the improvement of the steering stability during the high-speed running likewise the previously mentioned tires.

BRIEF DESCRIPTION OF THE DRAWINGS

The invention will be described with reference to the accompanying drawings, wherein:

FIG. 3 is a schematically partial developed view of a third embodiment of the tread pattern according to the invention.

DESCRIPTION OF PREFERRED EMBODIMENTS

Figure 1A:
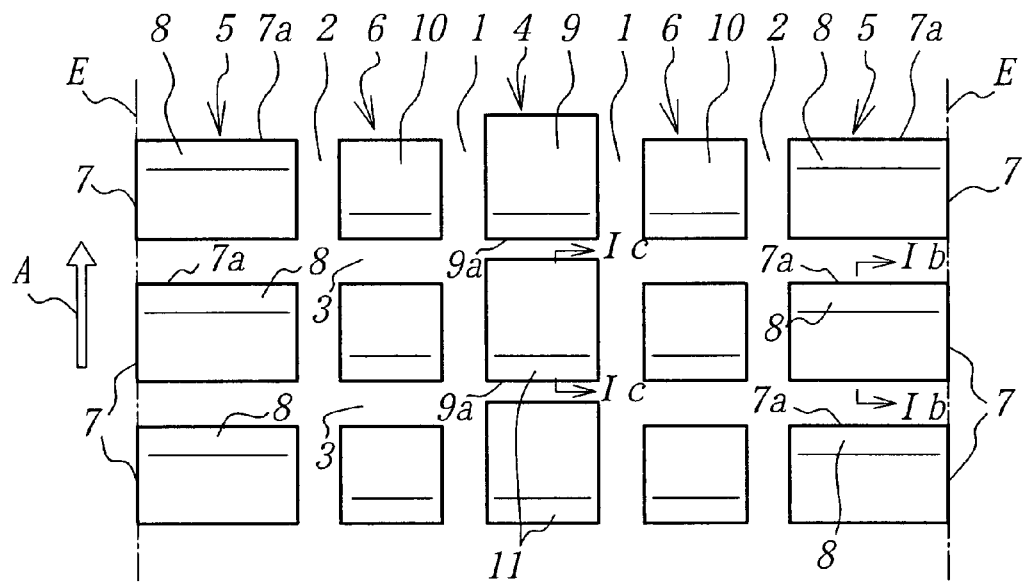
FIG. 1a is a schematically partial developed view of a first embodiment of the tread pattern according to the invention.
Figure 1B:
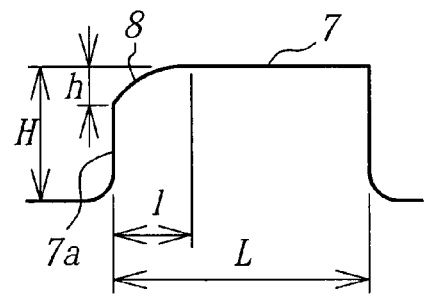
FIG. 1b is a diagrammatically section view of a block taken along a line Ib—Ib of FIG. 1.
Figure 1C:
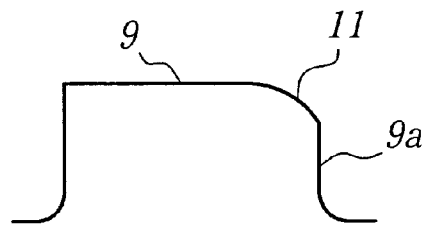
FIG. 1c is a diagrammatically section view of a block taken along a line Ic—Ic of FIG. 1.

In FIG. 1 is shown a first embodiment of the tread pattern according to the invention, wherein FIG. 1a is a schematically partial developed view of the tread pattern, and FIGS. 1b and 1c are diagrammatically section views of blocks in a circumferential direction of the tread taken along lines Ib—Ib and Ic—Ic, respectively.

Moreover, an inner structure of the tire is the same as in the generally used radial tire. Such an inner structure itself is not directly related to the invention, so that the illustration of the inner structure is omitted.

In the illustrated embodiment, a center block row 4 located on an equator of the tire, shoulder block rows 5 located at both outermost sides of a tread portion and middle block rows 6 located between the center block row and the shoulder block row are defined on a surface of a tread by four circumferential grooves 1, 2 extending straightforward in a circumferential direction of the tread and symmetrically located with respect to the equator of the tire, both tread side ends E and a plurality of lateral main grooves 3 extending across these circumferential grooves 1, 2 and substantially in a direction perpendicular thereto.

When such a tread portion is rotated upward as shown by an arrow A in FIG. 1a, a chamfered face 8 is formed on a leading edge portion of each shoulder block 7 in the shoulder block row 5 so as to gradually decrease a height of the block toward a leading edge 7a as seen from a section view of FIG. 1b, wherein a length l of a forming region for the chamfered face 8 is made not more than ⅓ of a circumferential length L of the shoulder block 7. Preferably, the chamfered face 8 is a curved face convexly extending outward in a radial direction of the tire.

Furthermore, it is favorable that a height h of the forming region for the chamfered face 8 is made not more than ⅓ of a height H of the shoulder block 7, whereby it is possible to effectively ensure the improvement of the steering stability as previously mentioned.

In blocks 9, 10 of the other block rows 4, 6, as shown in FIG. 1c illustrating a center block 9, a chamfered face 11 is formed on a trailing edge portion of the block so as to gradually decrease a height of the block toward a trailing edge 9a, wherein a forming region for the chamfered face 11 is made not more than ⅓ of a circumferential length of the block 9 likewise the above case. This is true in each block 10 of the middle block row 6.

Even in this case, the chamfered face 11 is favorable to be a curved face convexly extending outward in the radial direction of the tire and a height of a forming region therefor is favorable to be not more than ⅓ of a block height.

When the blocks 7, 9 and 10 are chamfered as mentioned above, if a certain slip angle is applied to the tire, the blocks 7 strongly and largely contact with ground at a side opposite to the slip angle applied side as compared with the blocks 9, 10 mainly based on a relative difference between the forming positions of the chamfered faces 8, 11 in the blocks, whereby the self-aligning torque of the tire can advantageously be increased.

Figure 2:
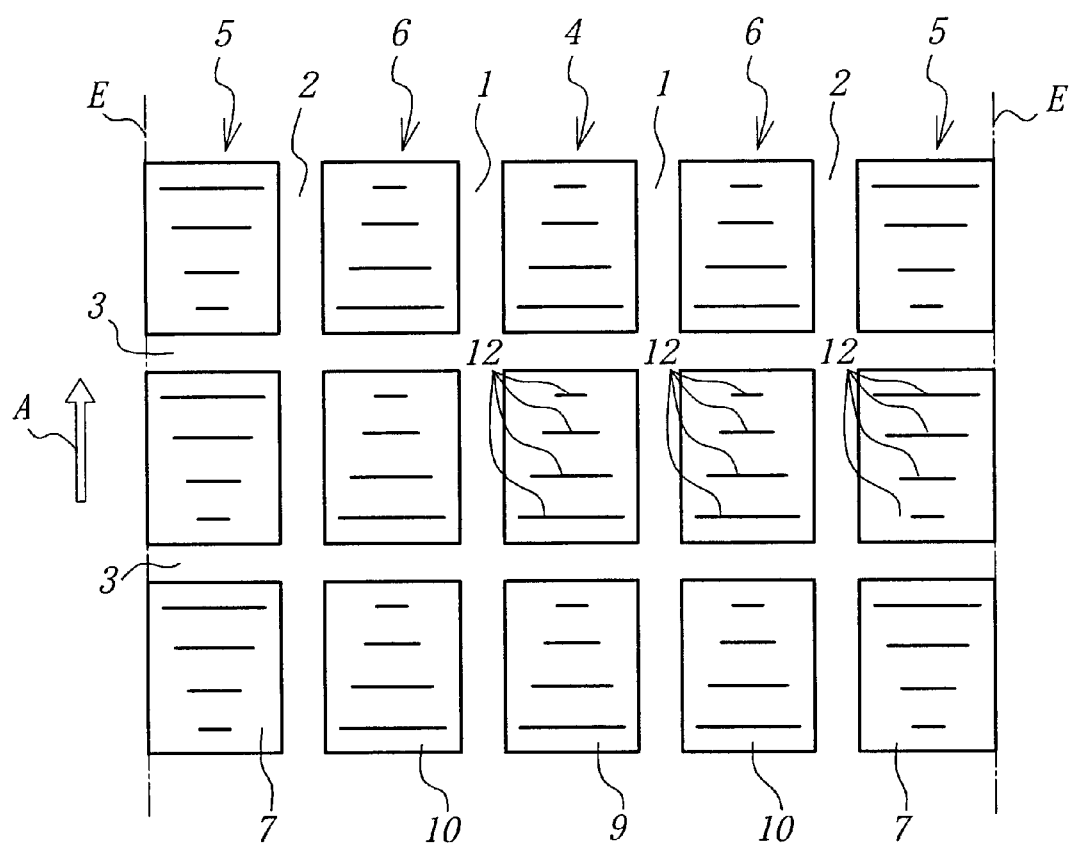
FIG. 2 is a schematically partial developed view of a second embodiment of the tread pattern according to the invention.

In FIG. 2 is shown a second embodiment of the tread pattern according to the invention, wherein a center block row 4 located on an equator of the tire, shoulder block rows 5 located at both outermost sides of a tread portion and middle block rows 6 located between the center block row and the shoulder block row are defined on a surface of a tread by four circumferential grooves 1, 2 extending straightforward in a circumferential direction of the tread and symmetrically located with respect to the equator of the tire, both tread side ends E and a plurality of lateral main grooves 3 extending across these circumferential grooves 1, 2 and substantially in a direction perpendicular thereto likewise the case of FIG. 1 and a plurality of sipes 12 each extending in a widthwise direction of the tread and being symmetry with respect to a line segment passing through a center of the block in the circumferential direction of the tread are formed in each of the blocks 7, 9, 10 so as to gradually change lengths of these sipes from an end of the block in the circumferential direction toward the other end thereof. The sipes 12 in the shoulder block 7 become long at a leading side of the block 7 and short at a trailing side thereof, and the sipes 12 in each of the center blocks 9 and middle blocks 10 become longer at a trailing side of the block than at a leading side thereof.

In the illustrated embodiment, both ends of all sipes 12 in each block are terminated in the block.

Moreover, the term "sipe" used herein means a narrow groove having generally an opening width of about 0.2–0.4 mm, wherein opposed groove walls of the sipe contact with each other in a ground contact region during the running of the tire under loading.

When a certain slip angle is applied to this tire, force directing backward in a running direction of the tire is created in the shoulder block 7 subjected to a large load based on the difference of the extending lengths of the sipes 12 between mutual blocks to cause couple force in the ground contact region of the tread, whereby the increase of the self-aligning torque in the tire can be realized.

In FIG. 3 is shown a third embodiment of the tread pattern according to the invention, wherein each of the blocks 7, 9, 10 in all the block rows 4, 5, 6 formed by the same method as in the first and second embodiments is provided with a single fine groove 13 extending in a widthwise direction of the tread across the block. The forming position of the fine groove 13 is a leading edge portion in the shoulder block 7 and a trailing edge portion in the other blocks 9, 10.

The term "fine groove" used herein means a groove having an opening width of about 0.5–3 mm.

Moreover, it is favorable that the fine groove 13 is located apart from an edge of the block near to the fine groove within a range of 0.1–0.35 times the length of the block in the circumferential direction for simultaneously establishing the steering stability and the resistance to uneven wear.

According to this tire, the increase of the self-aligning torque can be attained under substantially the same function of the blocks as shown in FIG. 2 based on the difference of the fine groove forming position between the mutual blocks.

The following examples are given in illustration of the invention and are not intended as limitations thereof.

EXAMPLE 1

There is provided a pneumatic tire having a tire size of 195/60R15 88H and a tread pattern shown in FIG. 1$a$, wherein a belt is comprised of two cross belt layers, cords of which layers are crossed with each other at a cord angle of 20° with respect to an equator of the tire and has a width of about 150 mm, and each block has a height of 5 mm and a length in circumferential direction L of 18.9 mm, and a chamfered face formed in a shoulder block has a forming region length l of 6 mm and a forming region height h of 1.2 mm. This tire is mounted onto a rim of 6J and inflated under an air pressure of 220 kPa and rotated on a drum testing machine at a speed of 60 km/h under a load of 4067 N while applying a slip angle of 3° to measure a self-aligning torque.

For the comparison, there is provided a comparative tire wherein the chamfered face formed in all of the blocks is the same as formed in the center block and the middle block shown in FIG. 1. The self-aligning torque of this comparative tire is measured in the same manner as mentioned above.

When the self-aligning torque is represented by an index on the basis that the comparative tire is 100, the index value of the example tire is 101, so that the self-aligning torque can be increased by about 1%.

EXAMPLE 2

There is provided a tire having the same structure as in Example 1 except that the tire has a tread pattern shown in FIG. 2, wherein four sipes having an opening width of 0.3 mm are formed in each of all blocks and lengths of the sipes in each of shoulder blocks located at a position apart from a tread end within 0.15 times a ground contact width of a tread successively change into 20 mm, 14 mm, 8 mm and 4 mm from a leading edge of the block and lengths of the sipes formed in the other blocks successively change into 20 mm, 14 mm, 8 mm and 4 mm from a trailing edge of the block. The self-aligning torque of this tire is measured in the same manner as in Example 1.

For the comparison, there is provided a comparative tire wherein four sipes having a length of 10 mm are formed in all of the blocks.

When the self-aligning torque is represented by an index on the basis that the comparative tire is 100, the index value of the example tire is 100.5, so that the self-aligning torque can be increased by about 0.5%.

EXAMPLE 3

There is provided a tire having the same structure as in Example 1 except that the tire has a tread pattern shown in FIG. 3, wherein each of all the blocks is provided with a fine groove having an opening width of 2 mm and the fine groove formed in the shoulder block is located apart from a leading edge of the block by ⅕ of a length of the block in a circumferential direction and the fine groove formed in the other blocks is located apart from a trailing edge of the block by ⅕ of a length of the block in the circumferential direction.

For the comparison, there is provided a comparative tire wherein the fine groove formed in all the blocks is located in a position corresponding to ½ of the length of the block in the circumferential direction.

When the self-aligning torque is represented by an index on the basis that the comparative tire is 100, the index value of the example tire is 101, so that the self-aligning torque can be increased by about 1%.

As mentioned above, according to the invention, the self-aligning torque of the tire can effectively be increased to advantageously improve the steering stability in the high-speed running of the vehicle.

What is claimed is:

1. A pneumatic tire comprising; a block pattern of a tread having at least three circumferential rows of blocks defined by a plurality of circumferential grooves extending in a circumferential direction of the tread and a plurality of lateral grooves each extending across the circumferential grooves and tread ends, each block in an outermost block row in a widthwise direction of the tread provided only on its leading edge portion with a chamfered face gradually decreasing a height of the block toward a leading edge, and each block in a remaining block row provided only on its trailing edge portion with a chamfered face gradually decreasing a height of the block toward a trailing edge thereof, and a length of a chamfered face is not more than ⅓ of a circumferential length of the block.

2. A pneumatic tire according to claim 1, wherein a height of the chamfered face is not more than ⅓ of a height of the block.

3. A pneumatic tire according to claim 1, wherein the chamfered face is a curved face convexly extending outward in a radial direction of the tire.

* * * * *